2,708,194

2-(1 - METHYL)POLYMETHYLENIMINYLMETHYL BENZHYDRYL ETHERS AND PREPARATION THEREOF

Frederick F. Blicke, Ann Arbor, Mich., assignor to Regents of The University of Michigan, Ann Arbor, Mich., a corporation of Michigan No Drawing. Application December 10, 1952, Serial No. 325,230

6 Claims. (Cl. 260—239)

This invention relates to 2-(1-methyl)polymethyleniminylmethyl benzhydryl ethers and to the process for their preparation. These new compounds have useful pharmacological properties and in particular are antispasmodic agents having atropine-like activity.

The compounds of my invention have the following structural formula:

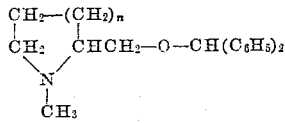

where $n$ is an integer from 1 to 4, and therefore includes four species, namely, 2-(1-methyl)pyrrolidylmethyl benzhydryl ether, 2-(1-methyl)piperidylmethyl benzhydryl ether, 2 - (1 - methyl)hexamethyleniminylmethyl benzhydryl ether and 2-(1-methyl)heptamethyleniminylmethyl benzhydryl ether.

The new basic ethers are prepared by heating a compound having the formula:

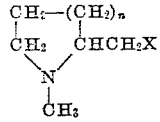

with a compound having the formula $X'CH(C_6H_5)_2$, where $n$ is an integer from 1 to 4 and one of X and X' is halogen and the other of X and X' is OH or OM where M is an alkali metal. Thus the alcohol reactant may be used as the free alcohol or as an alkali metal derivative thereof. When the free alcohol is used, an acid acceptor, i. e., a base such as an alkali metal salt of a weak acid, for example, potassium carbonate, is preferably added to take up the hydrogen halide formed as a by-product, although an excess of the basic reactant may alternatively be used as the acid acceptor and recovered as the hydrohalide salt.

The intermediate, 1-methyl - 2 - hydroxymethylpolymethylenimine, can be prepared by a variety of methods as illustrated in the examples below. The 1-methyl substituent is readily introduced by formylating the unmethylated compound, preferably with chloral, followed by reducing the resulting N-formyl compound with a reducing agent such as lithium aluminum hydride. The 2-hydroxymethyl radical is formed by reducing the corresponding compound containing a carbalkoxy group in the 2-position. The reducing agent in this case can be sodium-in-alcohol or, preferably, lithium aluminum hydride.

The new basic ethers are most conveniently used in the form of water-soluble, non-toxic acid-addition or quaternary ammonium salts, and these salts are within the purview of the invention. The acids which can be used to prepare acid-addition salts are those which produce when combined with the basic ethers, salts whose anions are relatively innocuous to the animal organism in therapeutic doses of the salts, so that the beneficial physiological properties inherent in the basic ethers are not vitiated by side-effects ascribable to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quaternary ammonium salts are obtained by the addition to the free base form of my compounds, of alkyl or aralkyl esters of inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate and methyl p-toluenesulfonate.

The following examples will further illustrate the invention.

Example 1

(a) *2-carbethoxy-5-pyrrolidone.*—Hydrogen chloride was passed into a mixture of 80 g. (0.54 mole) of glutamic acid and 650 cc. of absolute ethanol until the acid had dissolved. After the addition of 1 liter of absolute ethanol, the solution was refluxed for three hours. The alcohol was then removed under reduced pressure, the sirupy residue dissolved in water, and the solution was neutralized by the addition of solid sodium carbonate. The aqueous mixture was saturated with sodium chloride and extracted with six 100 cc. portions of chloroform. The chloroform solution was dried over anhydrous magnesium sulfate, the solvent removed and the residue dissolved in 400 cc. of xylene. The xylene solution was refluxed for twelve hours, the xylene removed under reduced pressure, and the residue was distilled, giving 52 g. (65%) of 2-carbethoxy-5-pyrrolidone, B. P. 130–132° C. (1 mm.) or 172–175° C. (11 mm.). When the product was cooled and rubbed it solidified M. P. 54–56° C.

(b) *2-hydroxymethylpyrrolidine.*—Lithium aluminum hydride (28.8 g., 0.72 mole) and 500 cc. of ether were placed in a 2 liter, 3-necked flask fitted with stirrer, condenser and a dropping funnel. The mixture was cooled in an ice-bath, stirred, and 53 g. (0.36 mole) of 2-carbethoxy-5-pyrrolidone dissolved in 500 cc. of ether was added dropwise. After the addition, the mixture was stirred and refluxed for twelve hours. The flask was cooled in an ice-bath, the mixture stirred, and 50 cc. of water was added dropwise. The mixture was filtered through a sintered glass filter, and the ether-insoluble material washed with ether. The ether solution from the filtrate and washings was combined, the solvent removed from the solution and the residue distilled, giving 20 g. (56%) of 2-hydroxymethylpyrrolidine, B. P. 96–98 C. (14 mm.).

The hydrochloride of 2-hydroxymethylpyrrolidine which is somewhat hygroscopic, melted at 57–58° C. after recrystallization from an isopropyl alcohol-ethyl acetate mixture.

The methiodide of 2-hydroxymethylpyrrolidine precipitated gradually after methyl iodide had been added to an ethereal solution of the base. It had the M. P. 286–288 C. (dec.) after recrystallization from isopropyl alcohol.

*Analysis.*—Calcd. for $C_6H_{14}ONI$: N, 5.76; I, 52.20. Found: N, 5.70; I, 52.03.

(c) *1-formyl-2-hydroxymethylpyrrolidine.* — Chloral (66 g., 0.45 mole) was added dropwise to 45 g. (0.45 mole) of 2-hydroxymethylpyrrolidine. The mixture was stirred for two hours at room temperature and then heated on a steam-bath for thirty minutes. The chloroform was evaporated off and the residue distilled, giving 54 g. (93) of 1-formyl-2-hydroxymethylpyrrolidine, B. P. 122–124° C. (0.5 mm.).

*Analysis.*—Calcd. for $C_6H_{11}O_2N$: N, 10.84. Found: N, 10.74.

(d) *1-methyl-2-hydroxymethylpyrrolidine.*—A solution of 53 g. (0.41 mole) of 1-formyl-2-hydroxymethylpyrrolidine in 250 cc. of ether was added dropwise to a stirred suspension of 16 g. (0.42 mole) of lithium aluminum hydride in 500 cc. of ether at 0° C. The mixture was then refluxed for six hours, cooled to 0° C. and water was added dropwise to decompose excess lithium hydride. The reaction mixture was filtered through a sintered glass funnel, the solid material washed with ether, and the combined ether filtrates and washings were dried over anhydrous magnesium sulfate. The ether solution was concentrated and the residue distilled giving 38.5 g. (82%) of 1-methyl-2-hydroxymethylpyrrolidine, B. P. 67–69° C. (12 mm.).

The methiodide of 1-methyl-2-hydroxymethylpyrrolidine, prepared in ether solution at room temperature, melted at 293–294° C. (dec.) after recrystallization from isopropyl alcohol.

*Analysis.*—Calcd. for $C_7H_{16}ONI$: N, 5.45; I, 49.36. Found: N, 5.35; I, 49.14.

(e) *2-(1-methyl)pyrrolidylmethyl benzhydryl ether.*—A mixture of 8.0 g. (0.07 mole) of 1-methyl-2-hydroxymethylpyrrolidine, 17.3 g. (0.07 mole) of diphenylbromomethane and 9.6 g. (0.07 mole) of anhydrous potassium carbonate was stirred and heated in a nitrogen atmosphere at 150–160° C. (bath temperature) for four hours. After the addition of 100 cc. of water, the mixture was extracted with ether and the extract then shaken with 5% hydrochloric acid. The aqueous, acidic solution was made alkaline, the precipitated product extracted with ether, the extract dried over anhydrous magnesium sulfate, the solvent removed and the residue fractionated, giving 11.7 g. (60%) of 2-(1-methyl)pyrrolidylmethyl benzhydryl ether, B. P. 114–117° C. (0.01 mm.).

The hydrochloride of 2-(1-methyl)pyrrolidylmethyl benzhydryl ether, obtained by treatment of an ethereal solution of the base with hydrogen chloride, was recrystallized from isopropyl alcohol and had the M. P. 177–178° C.

*Analysis.*—Calcd. for $C_{19}H_{24}ONCl$: N, 4.41; Cl, 11.15. Found: N, 4.59; Cl, 11.08.

The methobromide of 2-(1-methyl)pyrrolidylmethyl benzhydryl ether was obtained by the addition of methyl bromide to an ethereal solution of the base. The mixture was allowed to remain at room temperature for about a week, and the product had the M. P. 140–141° C. after recrystallization from isopropyl alcohol.

*Analysis.*—Calcd. for $C_{20}H_{26}ONBr$: N, 3.72; Br, 21.23. Found: N, 3.88; Br, 21.12.

Example 2

(a) *Alpha-pipecolinic acid hydrochloride.*—The hydrochloride of alpha-picolinic acid (26.5 g., 0.18 mole), dissolved in 80 cc. of water, was hydrogenated in the presence of 1 g. of platinum oxide catalyst, under an initial pressure of 50 pounds, until the calculated amount of hydrogen had been absorbed. After the mixture had been filtered, the solution was evaporated to dryness, and the residue was recrystallized from absolute ethanol, giving 22 g. (80%) of alpha-pipecolonic acid hydrochloride, M. P. 258–260° C.

(b) *2-hydroxymethylpiperidine.*—Lithium aluminum hydride (4.8 g., 0.12 mole) and 300 cc. of absolute ether were placed in a 1 liter, 3-necked flask equipped with a stirrer, dropping funnel and condenser. The mixture was cooled in an ice-bath, stirred, and 19 g. (0.12 mole) of ethyl alpha-pipecolinate dissolved in 100 cc. of ether was added dropwise. After the addition was completed, the mixture was refluxed for six hours. The mixture was cooled, stirred and 25 cc. of water was added dropwise. After the mixture had been stirred for one hour, it was filtered through a sintered glass filter, and the inorganic material was washed thoroughly with ether. The ethereal solution and the ether wash solution were combined, dried over anhydrous magnesium sulfate and then over sodium hydroxide. After removal of the ether, the product solidified after it had been cooled and rubbed, giving 12 g. (86%) of 2-hydroxymethylpiperidine, B. P. 104–106° C. (10 mm.), M. P. 67–69° C.

The hydrochloride, after recrystallization from isopropyl alcohol, melted at 130–132° C.

*Analysis.*—Calcd. for $C_6H_{14}ONCl$: N, 9.25; Cl, 23.38. Found: N, 9.08; Cl, 23.28.

The picrate, obtained by adding an alcoholic solution of picric acid dropwise to an ethereal solution of the base, melted at 135–137° C.

(c) *1-formyl-2-hydroxymethylpiperidine.*—2-hydroxymethylpiperidine (6.9 g., 0.06 mole) and 10 cc. of chloroform were placed in a 200 cc., 3-necked flask fitted with a stirrer, dropping funnel and a condenser to which a calcium chloride tube was attached. Chloral (8.9 g., 0.06 mole) was added dropwise to the stirred solution which was cooled in an ice-bath. After the addition, the mixture was stirred for one hour at room temperature. The chloroform was removed and the product distilled, giving 6.3 g. (73.4%) of 1-formyl-2-hydroxymethylpiperidine, B. P. 144–146° C. (2 mm.).

*Analysis.*—Calcd. for $C_7H_{13}O_2N$: N, 9.78. Found: N, 9.68.

(d) *1-methyl-2-hydroxymethylpiperidine.*—Lithium aluminum hydride (2.4 g., 0.06 mole) and 150 cc. of ether were placed in a 500 cc. 3-necked flask, and a solution of 6.0 g. (0.04 mole) of 1-formyl-2-hydroxymethylpiperidine dissolved in 150 cc. of ether was added dropwise to the cooled, stirred mixture. After the addition was completed, the mixture was refluxed for six hours and then worked up as described in Example 1, part (d), giving 3.5 g. (65%) of 1-methyl-2-hydroxymethylpiperidine, B. P. 96–98° C. (19 mm.).

The methiodide of 1-methyl-2-hydroxymethylpiperidine precipitated gradually after methyl iodide had been added to an ethereal solution of the base and had the M. P. 300–302° C. (dec.) after recrystallization from absolute ethanol.

*Analysis.*—Calcd. for $C_8H_{18}ONI$: N, 5.16; I, 46.83. Found: N, 5.07; I, 46.87.

(e) *1-methyl-2-piperidylmethyl benzhydryl ether* can be prepared by heating 1-methyl-2-hydroxymethylpiperidine and diphenylbromomethane in the presence of anhydrous potassium carbonate according to the method described in Example 1, part (e).

Example 3

(a) *2-carbethoxy-7-ketohexamethylenimine.*—A mixture of 400 cc. of chloroform and 80 cc. of concentrated sulfuric acid was placed in a 1 liter, 3-necked flask fitted with a stirrer and thermometer. After the mixture had been stirred and cooled to 0° C., 17 g. (0.1 mole) of 2-carbethoxycyclohexanone was added. Sodium azide (6.5 g., 0.1 mole) was then introduced into the mixture in small portions during a three hour period while the temperature was maintained below 10° C. After the mixture had been stirred for an additional hour at a temperature below 10° (until the evolution of nitrogen had ceased), it was poured onto ice, the chloroform layer was separated and the aqueous layer extracted several times with chloroform. The combined chloroform solutions were washed with sodium carbonate solution, then with water and dried over anhydrous magnesium sulfate. After the chloroform had been removed under reduced pressure, the residue solidified when it was rubbed and cooled, giving 10 g. (54%) of 2-carbethoxy-7-ketohexamethylenimine, B. P. 127–129° C. (1 mm.), M. P. 49–51° C. after recrystallization from petroleum ether (B. P. 60–70° C.).

*Analysis.*—Calcd. for $C_9H_{15}O_3N$: N, 7.56. Found: N, 7.54.

(b) *2-hydroxymethylhexamethylenimine.*—In the manner described in Example 1, part (b), a mixture of 20 g. (0.52 mole) of lithium aluminum hydride and 250 cc.

of ether was stirred and cooled, and a solution of 47 g. (0.25 mole) of 2-carbethoxy-7-ketohexamethylenimine in 450 cc. of ether was added. The product, 24.5 g. (75%) of 2-hydroxymethylhexamethylenimine, boiled at 118–120° C. (15 mm.).

The hydrochloride of 2-hydroxymethylhexamethylenimine precipitated when an ethereal solution of the base was treated with hydrogen chloride. It melted at 129–130° C. after recrystallization from isopropyl alcohol.

Analysis.—Calcd. for $C_7H_{16}ONCl$: N, 8.45; Cl, 21.40. Found: N, 8.31; Cl, 21.22.

(c) *1 - formyl-2-hydroxymethylhexamethylenimine.*—From 47 g. (0.37 mole) of 2-hydroxymethylhexamethylenimine and 55 g. (0.37 mole) of chloral according to the method described in Example 1, part (c), there was obtained 51.5 g. (89%) of 1-formyl-2-hydroxymethylhexamethylenimine which boiled at 133–136° C. (0.05 mm.).

Analysis.—Calcd. for $C_8H_{15}O_2N$: N, 8.92. Found: N, 8.75.

(d) *1-methyl-2-hydroxymethylhexamethylenimine* was prepared according to the method described in Example 1, part (d), from 51.5 g. (0.33 mole) of 1-formyl-2-hydroxymethylhexamethylenimine dissolved in 400 cc. of ether and a suspension of 13.2 g. (0.34 mole) of lithium aluminum hydride in 500 cc. of ether. The 42.7 g. (90%) of 1-methyl-2-hydroxymethylhexamethylenimine thus obtained boiled at 106–109° C. (16 mm.).

The methiodide of 1-methyl-2-hydroxymethylhexamethylenimine separated gradually after methyl iodide had been added to an ethereal solution of the base. It melted at 235–237° C. (dec.) after recrystallization from methanol.

Analysis.—Calcd. for $C_9H_{20}ONI$: N, 4.91; I, 44.50. Found: N, 4.83; I, 44.59.

(e) *2 - (1 - methyl)hexamethyleniminylmethyl benzhydryl ether.*—A mixture of 10.0 g. (0.07 mole) of 1-methyl-2-hydroxymethylhexamethylenimine, 17.3 g. (0.07 mole) of diphenylbromomethane and 9.6 g. (0.07 mole) of anhydrous potassium carbonate was stirred and heated at 150–160° C. (bath temperature) for four hours in a nitrogen atmosphere. About 100 cc. of water was then added to the cold mixture and the product was extracted with ether. The ether solution was extracted with 5% hydrochloric acid, and the acidic, aqueous solution was then made alkaline with potassium carbonate and extracted with ether. The ether extract was dried with anhydrous magnesium sulfate, the solvent removed and the residue distilled, giving 13.3 g. (60%) of 2-(1-methyl)-hexamethyleniminylmethyl benzhydryl ether, B. P. 145–147° C. (0.01 mm.).

The hydrochloride of 2-(1-methyl)hexamethyleniminylmethyl benzhydryl ether precipitated when an ethereal solution of the base was treated with hydrogen chloride. It melted at 154–155° C. after recrystallization from isopropyl alcohol.

Analysis.—Calcd. for $C_{21}H_{28}ONCl$: N, 4.05; Cl, 10.26. Found: N, 3.96; Cl, 10.12.

The methobromide of 2-(1-methyl)hexamethyleniminylmethyl benzhydryl ether precipitated gradually after methyl bromide had been added to an ethereal solution of the base; M. P. 164–166° C. after recrystallization from isopropyl alcohol.

Analysis.—Calcd. for $C_{22}H_{30}ONBr$: N, 3.46; Br, 19.74. Found: N, 3.44; Br, 19.72.

2 - (1 - methyl)hexamethyleniminylmethyl benzhydryl ether hydrochloride and methobromide were found to be active respectively at dilutions of about 1 part in 8,000,000 and 1 part in 22,000,000 in counteracting spasms induced by acetylcholine in isolated intestinal strips.

*Example 4*

(a) *2-carbethoxy-8-ketoheptamethylenimine.*—Chloroform (500 cc.) and 100 cc. of concentrated sulfuric acid were placed in a 1 liter, 3-necked flask fitted with a stirrer and a thermometer. The mixture was stirred, cooled to 0° C., and 22 g. (0.12 mole) of 2-carbethoxycycloheptanone was added. Sodium azide (9.1 g., 0.14 mole) was then introduced in small portions and the temperature of the mixture was kept below 10° C. The mixture was stirred for one hour at 10° C., or until the evolution of nitrogen had ceased. The material was poured over ice, the chloroform layer separated, and the aqueous layer was extracted with chloroform. The combined chloroform solutions were washed with sodium carbonate solution, then with water, and dried over anhydrous magnesium sulfate. The chloroform was removed under reduced pressure. The residue solidified after it had been cooled and rubbed, giving 12 g. (50%) of 2-carbethoxy-8-ketoheptamethylenimine, M. P. 96–98° C. after recrystallization from petroleum ether (B. P. 90–100° C.).

Analysis.—Calcd. for $C_{10}H_{17}O_3N$: C, 60.28; H, 8.60; N, 7.03. Found: C, 60.31; H, 8.54; N, 7.49.

(b) *2-hydroxymethylheptamethylenimine.*—In a 1 liter, 3-necked flask, fitted with a stirrer, condenser and Soxhlet thimble, were placed 10.4 g. (0.27 mole) of lithium aluminum hydride and 500 cc. of absolute ether. 2-carbethoxy-8-ketoheptamethylenimine (24 g., 0.12 mole) was placed in the thimble. The mixture was stirred and refluxed until all of the material in the thimble had dissolved and then for an additional three hours. The mixture was then cooled in an ice-bath, stirred rapidly, and 40 cc. of water was added dropwise. The material was filtered through a sintered glass funnel and the inorganic products washed thoroughly with ether. The ether solution and the wash ether were combined and dried over anhydrous magnesium sulfate, and the solvent was removed and the residue distilled, giving 12 g. (70%) of 2-hydroxymethylheptamethylenimine, B. P. 118–120° C. (10 mm.).

After methyl iodide had been added to an ethereal solution of 2-hydroxymethylheptamethylenimine, the methiodide gradually precipitated, M. P. 238–239° C. (dec.) after recrystallization from isopropyl alcohol.

Analysis.—Calcd. for $C_9H_{20}ONI$: N, 4.91; I, 44.52. Found: N, 4.99; I, 44.72.

(c) *1 - formyl - 2 - hydroxymethylheptamethylenimine.*—Chloral (8.2 g., 0.056 mole) was added dropwise to 8 g. (0.056 mole) of 2-hydroxymethylheptamethylenimine with cooling and stirring. The mixture was stirred for two hours at room temperature and then heated for one-half hour on a steam-bath. After removal of the chloroform the residue was distilled, giving 7.7 g. (80%) of 1-formyl-2-hydroxymethylheptamethylenimine, B. P. 162–165° C. (3 mm.). The product solidified after it had been rubbed under a very small amount of ether, M. P. 84–85° C. after recrystallization from ethyl acetate.

Analysis.—Calcd. for $C_9H_{17}NO_2$: C, 63.13; H, 10.01; N, 8.18. Found: C, 63.32; H, 9.82; N, 8.19.

(d) *1 - methyl - 2 - hydroxymethylheptamethylenimine.*—1 - formyl - 2 - hydroxymethylheptamethylenimine (7.0 g., 0.041 mole) dissolved in 500 cc. of ether was added dropwise to a suspension of 1.6 g. (0.043 mole) of lithium aluminum hydride in 200 cc. of ether. The mixture was stirred and refluxed for twelve hours, then treated with 20 cc. of water. The product was isolated by distillation, giving 5.3 g. (82%) of 1-methyl-2-hydroxymethylheptamethylenimine, B. P. 112–114° C. (11 mm.).

The methiodide of 1-methyl-2-hydroxymethylheptamethylenimine had the M. P. 234–235° C. (dec.) after recrystallization from absolute ethanol.

Analysis.—Calcd. for $C_{10}H_{22}ONI$: N, 4.68; I, 42.42. Found: N, 4.59; I, 42.19.

(e) *2 - (1 - methyl)heptamethyleniminylmethyl benzhydryl ether* can be prepared by heating 1-methyl-2-hydroxymethylheptamethylenimine and diphenylbromomethane in the presence of anhydrous potassium carb-

I claim:
1. A compound having the formula

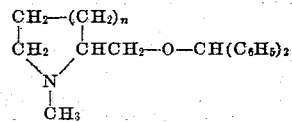

wherein n is an integer from 1 to 4.

2. 2 - (1 - methyl)pyrrolidylmethyl benzhydryl ether having the formula

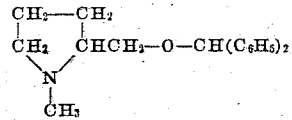

3. 2-(1-methyl)piperidylmethyl benzhydryl ether having the formula

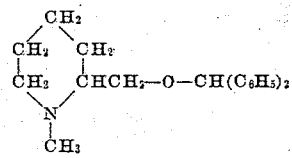

4. 2-(1-methyl)hexamethyleniminyl benzhydryl ether having the formula

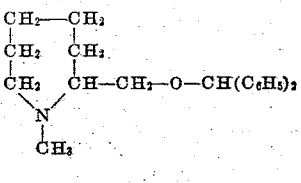

5. 2 - (1 - methyl)heptamethyleniminylmethyl benzhydryl ether having the formula

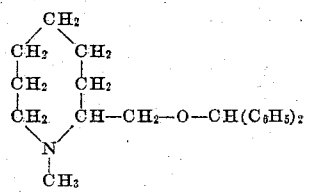

6. The process for preparing a 1-methyl-2-polymethyleniminylmethyl benzhydryl ether which comprises heating a compound having the formula

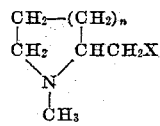

with a compound having the formula X'CH(C₆H₅)₂, wherein $n$ is an integer from 1 to 4 and one of X and X' is halogen and the other of X and X' is a member of the group consisting of OH and OM where M is an alkali metal.

References Cited in the file of this patent
UNITED STATES PATENTS

| 2,479,843 | Knox et al. | Aug. 23, 1949 |
| 2,567,350 | Rieveschl | Sept. 11, 1951 |